(12) United States Patent
Steinman et al.

(10) Patent No.: US 6,259,958 B1
(45) Date of Patent: Jul. 10, 2001

(54) CALL MECHANISM FOR STATIC AND DYNAMIC LINKED FUNCTIONS WITHIN AN OBJECT-ORIENTED CONTROLLER USING HETEROGENEOUS DEVELOPMENT TOOL SETS

(75) Inventors: Jethro F. Steinman, Havertown, PA (US); Pekka M. Salpakari, Varkaus (FI); Hannu J. Rehikainen, Varkaus (FI); Matti H. Ollikainen, Varkaus (FI); Alexander V. Chernoquzov; Shashank S. Narayan, both of Horsham, PA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 08/994,415

(22) Filed: Dec. 19, 1997

(51) Int. Cl.[7] .......................... G06F 19/00; G06F 15/163
(52) U.S. Cl. .......................... 700/97; 709/303; 709/305; 717/10
(58) Field of Search .................. 700/1, 95, 97; 707/103; 709/302, 303, 304, 305; 717/10

(56) References Cited

U.S. PATENT DOCUMENTS 4,800,521 * 1/1989 Carter et al. ..................... 364/900
5,613,120 3/1997 Palay et al. ..................... 395/710

FOREIGN PATENT DOCUMENTS 0 546 684 A2   6/1993 (EP) ................. G06F/9/44

* cited by examiner

Primary Examiner—Paul P. Gordon
(74) Attorney, Agent, or Firm—Hitt Chwang & Gaines

(57) ABSTRACT

For use within a computer-based digital control system, a calling mechanism and method for allowing both dynamic linked application objects and static linked application objects created with heterogeneous development tool sets to interact with a kernel of the system or with each other. In one embodiment, the calling mechanism includes: (1) a dynamic link interface that employs only standards-based software calls to allow the dynamic linked application objects to interact with the kernel, (2) a static link interface that employs at least one non-standard software call to allow the static link application objects to interact with the kernel and (3) at least one call router, operative to manage software calls among the kernel, the dynamic link application objects and the static link application objects, that detects software call types and routes the software calls to a selected one of the dynamic link interface or the static link interface based on the software call types.

21 Claims, 5 Drawing Sheets

CALL MECHANISM FOR STATIC AND DYNAMIC LINKED FUNCTIONS WITHIN AN OBJECT-ORIENTED CONTROLLER USING HETEROGENEOUS DEVELOPMENT TOOL SETS

TECHNICAL FIELD OF THE INVENTION

The present invention is directed, in general, to computing and processing systems and, more specifically, to a call mechanism for static and dynamic linked functions within an object-oriented controller using heterogeneous development tool sets and a real time plant control system employing the system or the method.

BACKGROUND OF THE INVENTION

Automated process control systems include a comprehensive set of control algorithms, or software-definable process control routines, to control and monitor various processes within, for instance, a manufacturing facility. The software for such control systems is frequently implemented using programming languages, such as "C++," that embody an object-oriented design methodology that employs a "Kernel" subsystem which manages execution of and interaction between various "application objects;" an application object is a software construct that may contain an algorithm used, for example, to control the operation of an actuator in a processing facility.

Within object-oriented software systems, the nature of the linking mechanism which joins application objects to the Kernel, and to each other, is very important; a linking mechanism may be either "static" or "dynamic." Generally, if a static linking mechanism is employed, software code modules are bound to each other rigidly and early in the software system development life-cycle. In addition, with a static linking mechanism, application objects typically cannot be changed or added independently of the Kernel or of each other; for example, if the Kernel changes, the application objects are re-released when the Kernel is released and, if any of the application objects are changed, the Kernel is re-released when the application objects are released.

In contrast to static linking mechanisms, if a dynamic linking mechanism is employed, software code modules are typically bound to each other later on in the software development life-cycle, e.g., at the time when an application configuration is loaded. In addition, using a dynamic linking mechanism, application objects can be changed or added independently of changes to the Kernel or other application objects; e.g., changes to the Kernel are not accompanied by releases of already existing application objects and should not force such a release and changes to application objects do not force release of the Kernel.

Within programming and execution environments, such as C++, both static and dynamic linking mechanisms are typically supported. The support for both types of linking mechanisms, however, is generally limited within a consistent tool set offered by a single vendor, which requires that the Kernel and the application objects be compiled and linked using a single vendor's tool, regardless of whether the linking mechanisms employed are static, dynamic, or some combination of both types. Examples of static and dynamic linking mechanisms of application objects may be found in well known technologies, such as the "Component Object Model" by Microsoft® and the "Common Object Request Broker Architecture" by Object Management Group; it is believed, however, that the foregoing software technologies do not provide for seamless calling of either static or dynamic linked application objects across heterogeneous tool sets.

When process controllers are implemented under an object-oriented software paradigm using a programming language such as C++, the software design and development has additional requirements. For example, the software for a process controller must be maintained and possibly even enhanced over an extended period of time. Additionally, modifications to the software might have to be accomplished using personnel working independently and geographically separate from each other. Furthermore, the lifetime of the product may exceed the lifetime of the software development tools used, necessitating the introduction of a new software tool set without invalidating existing application object software.

Accordingly, what is needed in the art is an improved object-oriented controller design that supports both static and dynamic linking mechanisms; more particularly, what is needed in the art are means to support dynamic linking of application objects that are robust against changes in software tools used to maintain and modify controller software.

SUMMARY OF THE INVENTION

To address the above-discussed deficiencies of the prior art, it is a primary object of the present invention to provide a way of allowing dynamic linked application objects to interact with a kernel without regard to the identity of the tool set employed to develop the dynamic linked application object.

In the attainment of the above primary object, the present invention provides, for use within a computer-based digital control system, a calling mechanism and method for allowing both dynamic linked application objects and static linked application objects created with heterogeneous development tool sets to interact with a kernel of the system or each other. In one embodiment, the calling mechanism includes: (1) a dynamic link interface that employs only standards-based software calls to allow the dynamic linked application objects to interact with the kernel, (2) a static link interface that employs at least one non-standard software call to allow the static link application objects to interact with the kernel and (3) at least one call router, operative to manage software calls among the kernel, the dynamic link application objects and the static link application objects, that detects software call types and routes the software calls to a selected one of the dynamic link interface and the static link interface based on the software call types.

The present invention therefore provides two distinct interfaces for software calls: (1) a standards-based interface to guarantee compatibility with later-developed dynamic linked application objects (based on the fact that all development tool sets for a given language include standard calls) and (2) an interface containing at least one nonstandard call such that static linked application objects can avail themselves of more advanced calls specific to a given tool set. The present invention also discerns call types and route calls to one of the interfaces as a function thereof. The software calls may originate in any one of the kernel, the dynamic linked application objects and the static linked application objects and may terminate in any one of the kernel, the dynamic linked application objects and the static linked application objects.

In one embodiment of the present invention, the standards-based software calls are based on American National Standards Institute (ANSI) standards. Those skilled in the art are familiar with ANSI-standard languages. In one embodiment, the standards-based software calls are C language calls. In a related embodiment, the at least one nonstandard call is a C++ language call. C is one language subject to ANSI standards. C++ is not standardized in all its features, but affords attractive programming features. Of course, the present invention can operate with other standards-based and nonstandard languages.

In one embodiment of the present invention, the call router detects the software call types by detecting an interface pointer structure (IPS) pointer associated with each of the dynamic linked application objects. In an embodiment to be illustrated and described, the structure and function of IPS pointers will be set forth in detail. Of course, the call router may detect software call types by another means.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figures 1, 2:
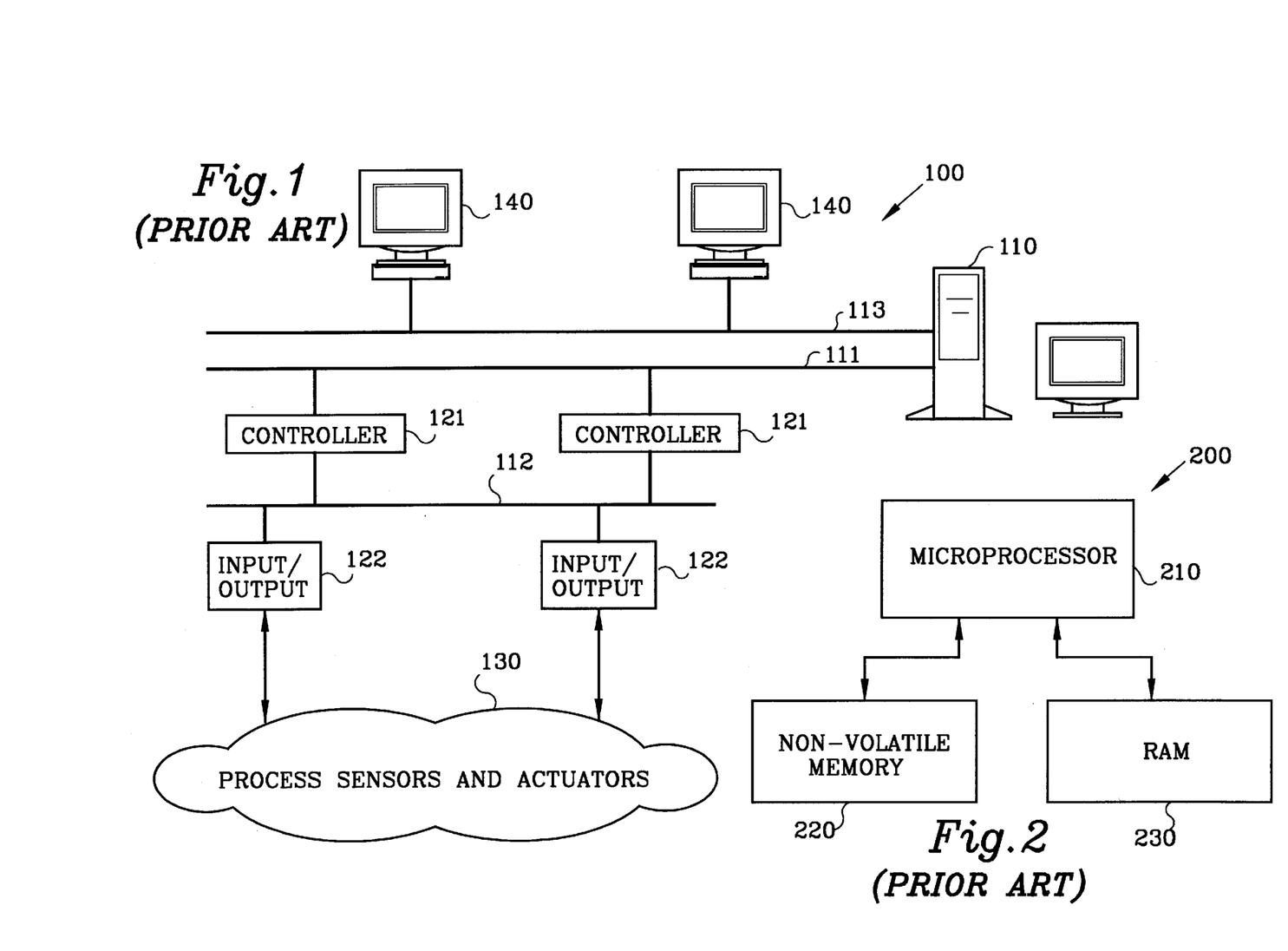
FIG. 1 illustrates a functional diagram of an exemplary distributed, real-time process control system with which the present invention may be employed.
FIG. 2 illustrates a high-level block diagram of an exemplary digital processing system that may be employed to execute software-definable process control routines embodying the principles of the present invention.

Before undertaking a description of an exemplary embodiment of the systems and methods of the present invention, it will be helpful to describe a computing or processing system environment in which the present invention may suitably be used or implemented; referring initially to FIG. 1, illustrated is a functional diagram of an exemplary distributed, real-time process control system (generally designated 100). Process control system 100 illustratively includes a computer network having a server 110 and a controller network 111. The controller network 111 provides an interface between the server 110 and process controllers (generally designated 121); the controller network 111 may, for example, carry supervisory messages between the server 110 and process controllers 121, and peer-to-peer messages between the process controllers 121. The process controllers 121 communicate with input/output (I/O) devices 122 via an I/O network 112. The process controllers 121 are adapted to execute software-definable process control routines for controlling and receiving data from process sensors and actuators 130 via I/O devices 122 and I/O network 112. Those skilled in the art are familiar with various types of process sensors and actuators 130, such as electrically-controllable motors, valves, pumps, etc., that may be employed within the process industry; the principles of the present invention are not limited to a specific process or processing system, however, but may readily be employed to advantage in any such system.

In one embodiment, the process control system 100 further includes a local area network (LAN) 113 that provides an interface between the server 110 and remote workstations (generally designated 140). The remote workstations 140 may be used by system operators to control and monitor the operation of the process control system 100. Although illustrated as a separate network, the LAN 112 and controller network 111 may be the same; i.e., the remote workstations 140 and the process controllers 120 may share the same network transmission medium. Those skilled in the art will recognize, however, that providing separate networks for control systems and operator workstations may enhance the reliability of a distributed, real-time process control system; e.g., network traffic on LAN 112 associated with distributing process-related data from server 110 to operator workstations 140 will not interfere with process control information transmitted between server 110 and remote process controllers 120 via control network 111.

Software-definable process control routines may be executed by any digital processing system, such as server 110, workstations 140, or process controllers 121. FIG. 2 illustrates a high-level block diagram of an exemplary digital processing system 200 that may be employed to execute software-definable process control routines, or application objects, embodying the principles of the present invention. Exemplary digital processing system 200 includes a microprocessor 210, non-volatile memory 220, and random access memory (RAM) 230. Non-volatile memory 220, which is employed to store software-definable process control routines, may comprise, for example, a programmable read-only memory (PROM), flash ROM, or a magnetic storage medium. The software-definable process control routines stored in non-volatile memory 220 are executed by microprocessor 210. The microprocessor employs RAM 230 to store all or portions of the process control routines as the routines are executed, as well as storage for process control data associated with process sensors and actuators 130. The description of exemplary digital processing system 200 is merely illustrative; those skilled in the art will recognize that software-definable process control routines employing the principles of the present invention are not limited to a specific hardware implementation for digital processing system 200, and that all such systems are within the scope of the claims recited hereinafter.

Within a process controller employing object-oriented code, i.e., an "object-oriented controller," algorithms and their associated data can be implemented as objects called "blocks." Data within a block can be read from, or written to, named attributes of blocks, called "parameters." Data flow between different blocks can be accomplished by establishing a "connection" from an output parameter of one block to an input parameter of a second block.

There are numerous object-oriented software systems, based on the C and C++ programming environments, which provide for static linking, dynamic linking or both; these object oriented software systems, however, do not provide for seamless calling of either static or dynamic linked application objects across heterogeneous tool sets. The present invention anticipates the need to provide an interface between dynamically linked application objects and the Kernel or other application objects which is both stable and robust against software tool changes; accordingly, the present invention discloses a novel software "calling mechanism" which permits dynamic linked code modules, or blocks, to use "call routines" written in an American National Standards Institute (ANSI) standard programming language, such as C, which are robust against changes in software tool sets, while still allowing static linked code modules to interface with the Kernel or other application objects using a non-standard programming language, such as C++.

Figure 3:
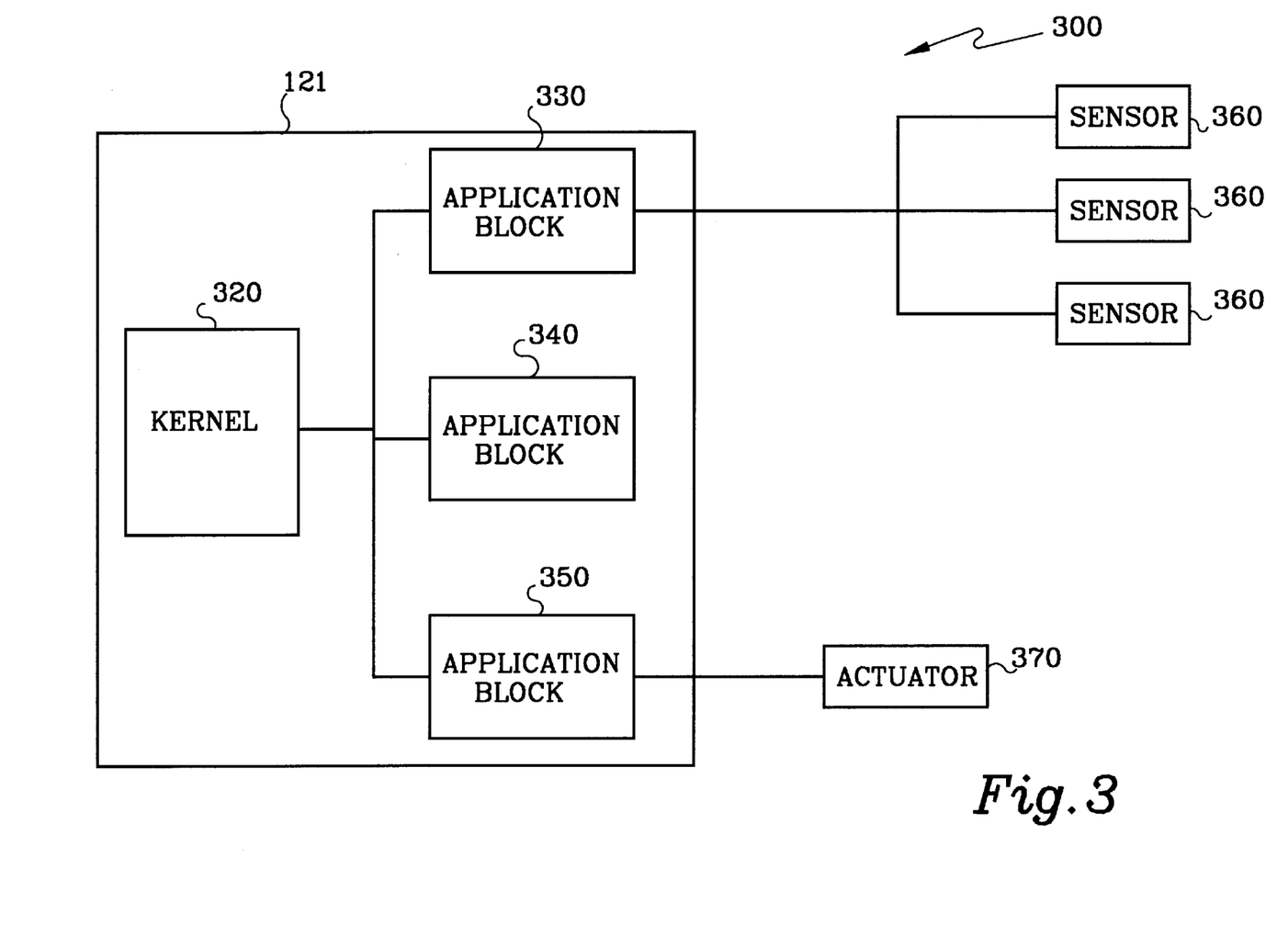
FIG. 3 illustrates an embodiment of a real-time process control system controlled by software developed in an object-oriented programming environment that employs the principles of the present invention.

Turning now to FIG. 3, illustrated is an embodiment of a real-time process control system 300 controlled by software developed in an object-oriented programming environment that employs the principles of the present invention. The process control system 300 includes a controller 121, as described with reference to FIG. 1. The controller 121 executes object-oriented code having a Kernel 320 and a plurality of application blocks; three application blocks are illustrated and are designated as first, second and third application blocks 330, 340, and 350, respectively. In the illustrated embodiment, the first application block 330 is coupled to a plurality of transducers (generally designated 360) which may be, for example, temperature or pressure sensors used to monitor a process environment; the third application block 350 is coupled to an actuator 370.

Central to the principles of the present invention is the notion of an "interface" within a software system; in this context, an interface consists of a collection of subroutines or functions, each having a defined calling protocol or signature. A software subsystem which defines an interface for other subsystems to call is known as a "supplier;" a software subsystem which uses an interface to make calls upon another subsystem is known as a "client." The context and types of interfaces disclosed by the present invention may be explained further by referring to FIGS. 4A, 4B and 4C.

Figure 4A:
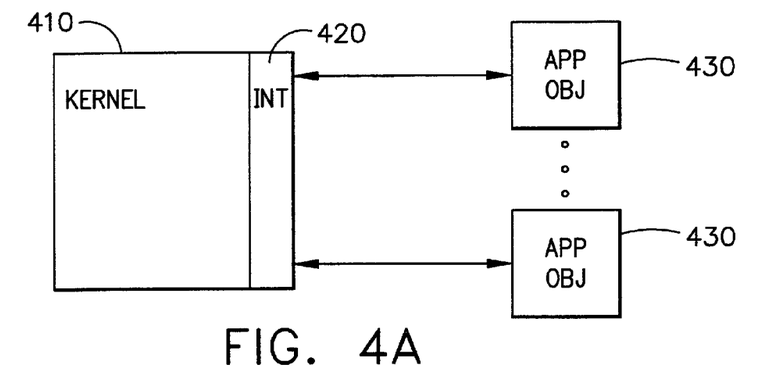
FIG. 4A, 4B and 4C illustrate exemplary interfaces between a Kernel and a plurality of application objects according to the principles of the present invention.
Figure 4B:
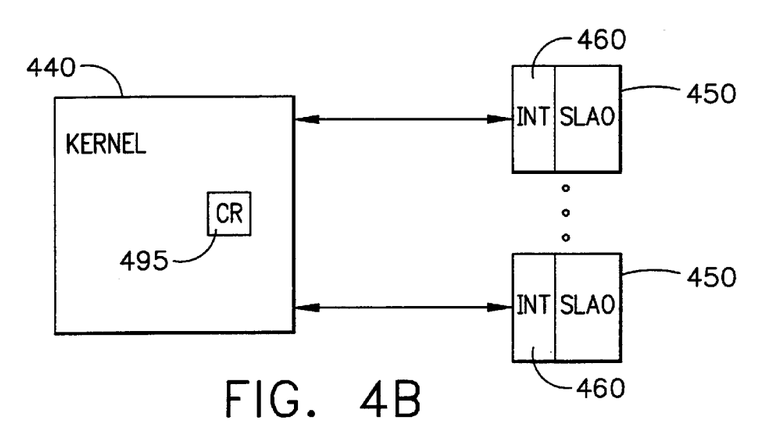
Figure 4C:
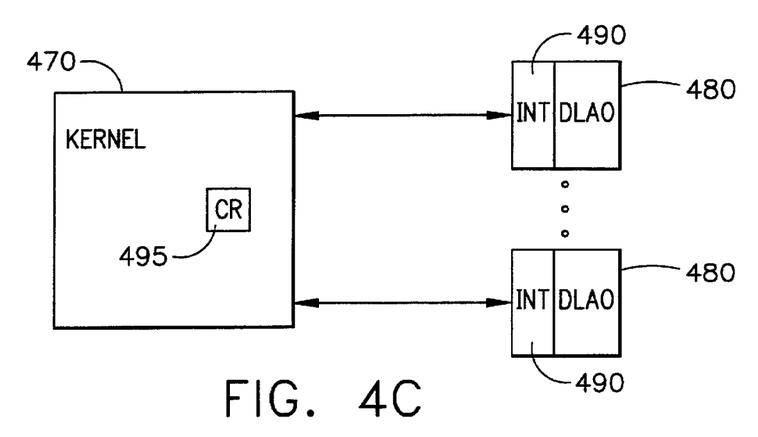

Turning now to FIGS. 4A, 4B and 4C, illustrated are exemplary interfaces between a Kernel and a plurality of application objects according to the principles of the present invention; the three interfaces are denominated herein as the "Application-Object-to-Kernel," the "Kernel-to-Static-Application-Object," and the "Kernel-to-Dynamic-Application-Object" interfaces, respectively. In FIG. 4A, a Kernel 410 is coupled to a plurality of application objects 430 by an interface 420; the Kernel 410 functions as a supplier and defines a set of functions, i.e., interface 420, which are called by the application objects 430, which function as clients. The single interface 420 is used by all of the application objects 430 regardless of the implementation or function of each object.

In FIG. 4B, a plurality of statically-linked application objects, generally designated 450, each have an interface 460; each interface 460 is equivalent, regardless of differences in the implementation or function of the application objects 450. The statically-linked application objects 450, which function as suppliers, each define a set of functions which are called by the Kernel 440, which functions as a client.

In FIG. 4C, a plurality of dynamically-linked application objects 480, functioning as suppliers, each have an interface 490; each of the interfaces 490 is equivalent, regardless of differences in implementation or function, and defines a set of functions which are called by the Kernel 470, functioning as a client. Also illustrated in FIGS. 4B and 4C is a call router 495 that manages software calls within the Kernel; the call router routes software calls to either a dynamic linked interface or a statically-linked interface 460 based on software call types.

It should be readily apparent to those skilled in the art that although not depicted in FIGS. 4A, 4B and 4C, the teachings of the present invention can also be used to accomplish Application Object to Application Object interfacing, with static-static, dynamic-dynamic, static-dynamic or dynamic-static objects connected across the interface.

The Application-Object-to-Kernel interface 420 is simpler in concept than the other two, due to the Kernel 410 having cardinality 1 within the system. All application objects access the same Kernel instance to request fulfillment of services; this makes it unnecessary to identify the Kernel within the interface protocol. The other two interfaces, i.e., the Kernel-to-Static-Application-Object interface 460 and the Kernel-to-Dynamic-Application-Object interface 490, are supplied by cardinality "N" objects.

As a client of the Kernel-to-Static-Application-Object interface and the Kernel-to-Dynamic-Application-Object interface, the Kernel must indicate which application object is being accessed as part of service invocation. Moreover, since the function and implementation of a service can differ depending on which type of application object is being accessed, both interfaces must support a form of type abstraction; type abstraction is commonly referred to as "polymorphism," where polymorphism means that the same operation may behave differently on different objects.

For the Kernel-to-Static-Application-Object interface 460, or simply "static link interface," polymorphism is provided, for example, by a C++ calling mechanism, which works well as long as the client and supplier are joined by a static link using homogenous software tools. The calling mechanism, however, may fail when using heterogeneous software tools because the placement of a pointer, such as a Virtual Function Table Pointer ("VFTP"), within the instance is not specified by an existing standard; i.e., the placement can differ from one compiler to another. Using a homogenous set of software tools, however, to link the Kernel and statically linked application objects poses no difficulty since the nature of static links requires that these subsystems always be released in tandem.

To provide for the Kernel-to-Dynamic-Application-Object interface 490, or simply "dynamic link interface," heterogeneous tool sets must be supported over the lifetime of the product employing the software in order to allow for software tool set changes or obsolescence, thus requiring that the calling mechanism be written in an ANSI standard programming language, such as C, to allow portability across heterogenous tool sets. Provision of polymorphism under a C calling mechanism is not built into the programming language as it is for C++; the C++ language, however, is a non-standard programming language.

Techniques are available for implementing polymorphism in the C language; TABLE 1 provides one technique for providing polymorphism under a C language calling mechanism.

TABLE 1

```
struct ApplicationObjectIPS {
    void (*pFunction1) (ApplicationObject*);
    Void (*pFunction2) (ApplicationObject*);
}
```

In one embodiment, an Interface Pointer Structure ("IPS") is instantiated to hold pointers to each function that makes up the interface. Preferably, one IPS is instantiated for every type of dynamic application object in the software system; a pointer ("pIPS") to the IPS is stored within each instance. When the Kernel invokes a function upon the instance, it begins with a pointer to the instance, i.e., "pInstance." The function invocation may then proceed as illustrated in TABLE 2.

TABLE 2

```
pIPS = pInstance->pIPS;
(*pIPS->pFunction1) (pInstance);
```

Despite differences in implementation, the Kernel-to-Static-Application-Object interface 460 and the Kernel-to-Dynamic-Application-Object interface 490 are parallel; i.e., there is a one to one correspondence between the function that each defines. The purpose and use of parallel functions are equivalent.

The central problem addressed by the present invention is how to enable the Kernel to access the services of both statically and dynamically linked application objects by allowing the Kernel to use both the IPS pointer described above and a calling mechanism provided for in a non-standard programming language, such as the C++ "Virtual Function" calling mechanism. For ease of explanation, the principles of the present invention will be described hereinafter in the context of a C++ programming language environment; those skilled in the art, however, will readily appreciate that the methods disclosed herein may be advantageously implemented in other programming environments, and that the scope of the claims recited hereinafter are not limited to any particular programming or computing environment.

To solve the aforementioned problem, the present invention recognizes that it is necessary to insure that each application object instance has a pIPS in a defined location. The pIPS can be used during Kernel calls for two purposes: (1) to identify whether the instance corresponds to a static or a dynamic application object; e.g., a null value of pIPS can be used to indicate a static application object while a non-null value can be used to indicate a dynamic application object; and (2) to provide a reference to the IPS for those instances which are dynamic application objects.

Within the C++ programming environment, however, the presence of an implicit VFTP within instances of static application objects makes it impossible to allocate pIPS within a C++ class definition. This is because C++ compilers generally, but not always, place the VFTP at the top (lowest address) of a class instance. Therefore, the offset of a pIPS allocated as a data member can only be reliably known by the compiler which created the instance. Thus, in general, PIPS cannot be allocated as a class data member.

The method disclosed by the present invention allocates each application object instance with a header which holds the pIPS; when the Kernel uses pInstance to call an application object service, it uses a negative offset off of pInstance to access pIPS. Since the header allocation is outside of any C++ class definition, the header is unaffected by the C++ compiler characteristics. The method may be explained further with reference to FIG. 5.

Figure 5:
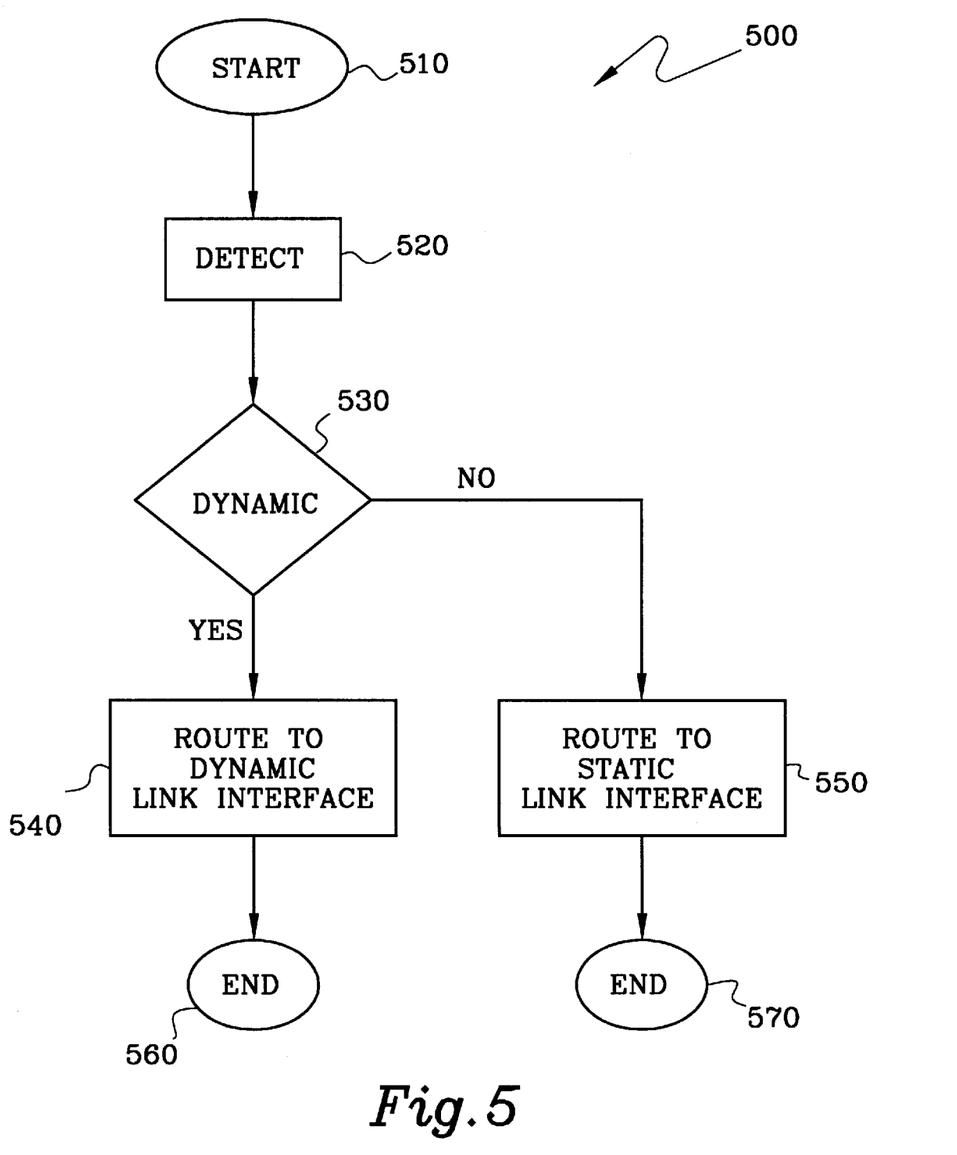
FIG. 5 illustrates an exemplary flow diagram of a calling process employing a calling mechanism for static and dynamic linked functions according to the principles disclosed by the present invention.

Turning now to FIG. 5, illustrated is an exemplary flow diagram of a calling process 500 employing a calling mechanism for static and dynamic linked functions according to the principles disclosed by the present invention. The calling process 500 is initiated in step 510, when the Kernel invokes an application object service (see table 2). The service or function invocation is detected using conventional methods in Step 520; those skilled in the art will readily appreciate that detection methods are well known in the art and will not be particularly described herein.

In a decisional step 530, the process 500 determines if the service invocation is to a static application object or to a dynamic application object. As described hereinabove, when the Kernel calls an application object, it uses a pointer to the instance, e.g., pInstance. Additionally, when the Kernel uses pInstance to call an application object service, it uses a negative offset of pInstance to access pIPS. An exemplary embodiment of a generalized call mechanism, that includes at least one "call outer" (generally one "router" for each function in each interface), that will apply to both static and dynamic application objects is provided in TABLE 3.

TABLE 3

```
inline void InvokeFunction1 (ApplicationObject* pInstance) {
ApplicationObjectIPS* pIPS =
    ( ApplicationObjectIPS*) (*((UINT32*)pInstance - 1));
if (pIPS == NULL)
    pInstance->Function1();
else
    (*pIPS->Function1) (pInstance);
}
```

The Kernel can use the inline function provided in TABLE 3 to distinguish static from dynamic application objects and to invoke the respective function on either according to the defined signature. If it is determined that the Kernel is calling a static application object function, the call is routed to a static link interface, in step 550, where the functions supplied by static application objects can be invoked by C++ calls in the form of:

pInstance→Function1();

Following the invocation of the static application object function, the process 500 ends in a step 570.

If it is determined that the Kernel is calling a dynamic application object function, the call is routed to a dynamic link interface, in a step 540, where the functions supplied by dynamic application objects are invoked by C calls in the form of:

(*pIPS→Function1)(pInstance);

Following the invocation of the function, the process 500 ends in a step 560.

The above provides a description of the unique calling mechanism disclosed by the present invention; a description of the necessary implementation details are known in the art and are not necessary to enable one skilled in the art to make and practice the invention described herein. The callable functions may be written in an ANSI standard programming language, such as the C programming environment, or they may be implemented as "wrapper" functions which redirect the "request" to a call, written in a non-standard programming language, such as the C++ programming environment, within the context of software code that is used to implement the dynamic application objects. Alternatively, if the interface protocol does not support direct calls between application objects, the calls may be routed through a "dispatcher" service within the Kernel.

Figure 6:
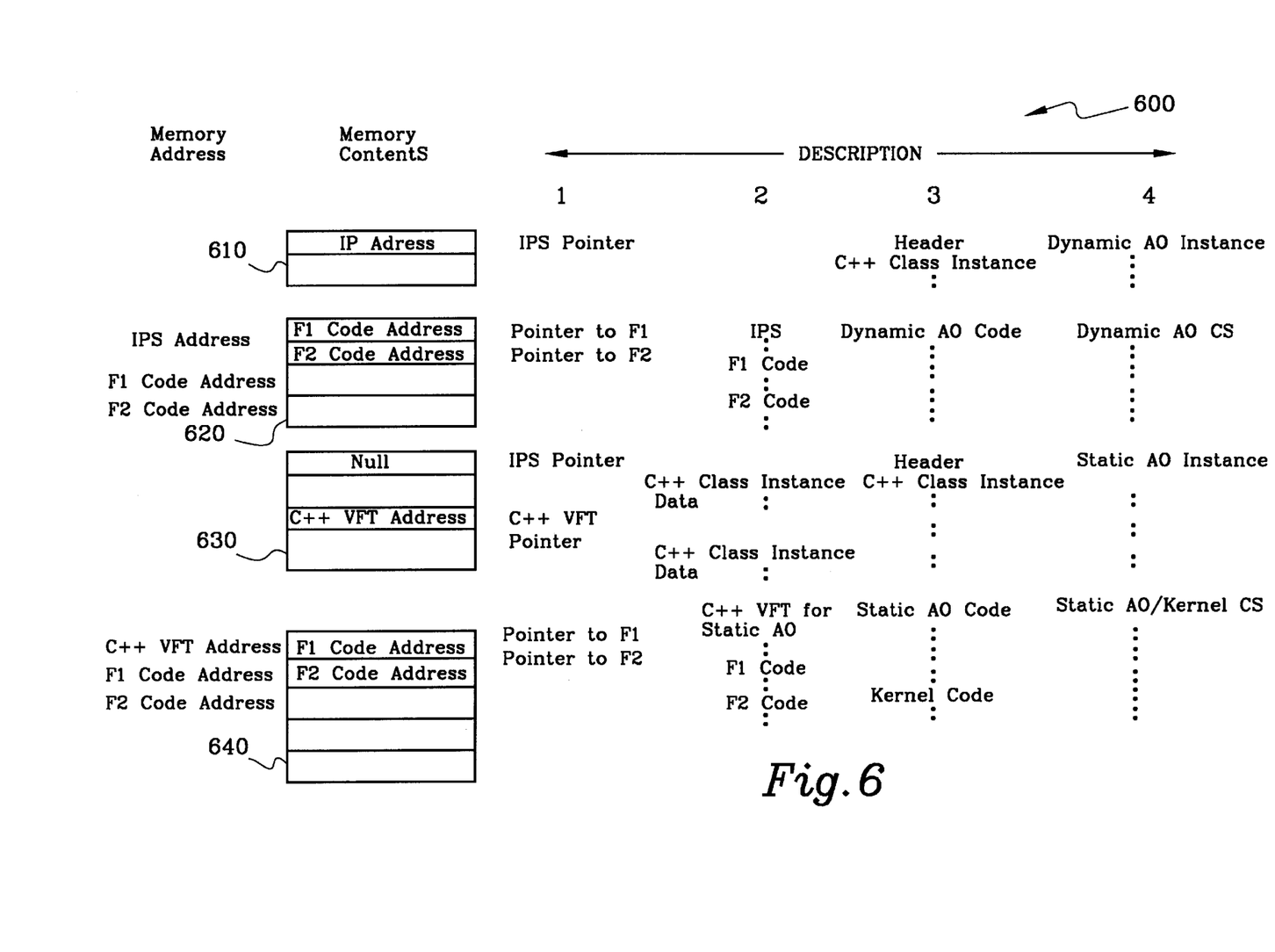
FIG. 6 illustrates an exemplary data structure used in the practice of the present invention.

Turning now to FIG. 6, illustrated is an exemplary data structure 600 used in the practice of the present invention; abbreviations used in FIG. 6 include: Interface Pointer Structure ("IPS"), Virtual Function Table ("VFT"), Function 1 ("F1"), Function 2 ("F2"), application object ("AO"), and code segment ("CS"). The data structure 600 includes first, second, third and fourth segments 610, 620, 630, and 640, respectively. The "Memory Contents" column contains an exemplary memory layout with the lowest memory address at the top, i.e., IPS Address. The first and third segments 610, 630 contain object instance data and the second and fourth segments 620, 640 contain code. Within each segment, there are certain contiguous regions of storage; the storage regions may correspond to individual data cells with a particular content, e.g., Null, or to whole objects. The "Memory Address" column provides names for addresses of segments or addresses of cells within segments; only names for addresses specifically referenced elsewhere in FIG. 6 are provided.

Also shown in FIG. 6 are four headings, designated as first, second, third and fourth descriptions, which describe how the whole first, second, third and fourth segments 610, 620, 630, 640, or smaller regions within the segments, may be used. In general, the column designated as the first description applies to the smallest memory regions, while the column designated as the fourth description applies to the largest memory regions. The first, second, third and fourth description columns describes how "aggregation" or "containment" may be employed within the calling scheme disclosed by the present invention.

From FIG. 6, those skilled in the art will recognize certain characteristics of the call mechanism disclosed herein. First, the IPS address in the first segment 610 serves the same role for function calls on dynamic application objects that the C++ VFT address, in the third segment 630, does for function calls on static application objects; both are pointers to the code space for the corresponding application object. Second, application objects have two memory cells reserved for function table pointers, i.e., IPS and C++ VFT; for static application objects, the IPS pointer is always a "NULL" value, where the "NULL" value is an indication to the call mechanism (described in Table 3) to perform a C++ VFT call. Conversely, dynamic application objects will always have a non-NULL IPS pointer, as shown in the first segment. In other embodiments, the dynamic application objects may have an additional C++ VFT pointer, in which case all the C++ VFT pointers will reference functions within the dynamic application objects code segments.

Although only two functions, i.e., F1 and F 2, along with a single static and dynamic application object instance are shown in the first, second, third and fourth segments 610, 620, 630, 640, those skilled in the art will readily recognize that any number of functions and application object instances, both static and dynamic, may be supported using the disclosed calling mechanism; the only limitation on a particular implementation being a function of the amount of available memory.

From the foregoing, those skilled in the art will recognize that the calling mechanism for static and dynamic linked functions may be provided in a process control system. The calling mechanism provided by the present invention provides advantages over the prior art, such as supporting both static and dynamic linked application objects; allowing a software implementation to start with static application objects and be able to add dynamic application objects with minimal or no impact to the existing static application objects; and allowing new software tool sets to be used during the product lifetime without forcing the re-release of existing dynamic application objects.

The principle characteristics of the invention disclosed herein can be summarized as follows: (1) static linked application objects and the Kernel can be developed in a standard or non-standard programming environment; (2) dynamic linked application objects can be developed in a non-standard programming language and linked with the Kernel according to a standard programming environment calling mechanism; use of an ANSI standard programming language insures that the calling mechanism will be supported by any future tool set; and (3) the Kernel employs a call mechanism which can distinguish static linked application objects from dynamic linked application objects; the former are called via a non-standard programming environment calling mechanism while the latter are called via a standard programming environment calling mechanism.

From the foregoing, it is apparent that the present invention provides, for use within a computer-based digital control system, a calling mechanism and method for allowing both dynamic linked application objects and static linked application objects created with heterogeneous development tool sets to interact with a kernel of the system or with each other. The calling mechanism includes: (1) a dynamic link interface that employs only standards-based software calls to allow the dynamic linked application objects to interact with the kernel, (2) a static link interface that employs at least one non-standard software call to allow the static link application objects to interact with the kernel and (3) at least one call router, operative to manage software calls among the kernel, the dynamic link application objects and the static link application objects, that detects software call types and routes the software calls to a selected one of the dynamic link interface and the static link interface based on the software call types.

Although the present invention and its advantages have been described in detail, those skilled in the art should understand that they can make various changes, substitutions and alterations herein without departing from the spirit and scope of the invention in its broadest form.

What is claimed is:

1. For use within a computer-based digital control system, a calling mechanism that allows both dynamic linked application objects and static linked application objects created with heterogeneous development tool sets to interact with a kernel of said system via calls, comprising:

a dynamic link interface that employs only standards-based software calls to allow said dynamic linked application objects to interact with said kernel via calls;

a static link interface that employs at least one non-standard software call to allow said static link application objects to interact with said kernel via calls; and at least one call router, operative to manage software calls among said kernel, said dynamic link application objects and said static link application objects, that detects software call types and routes said software calls to a selected one of said dynamic link interface and said static link interface based on said software call types.

2. The calling mechanism as recited in claim 1 wherein said standards-based software calls are based on American National Standards Institute (ANSI) standards.

3. The calling mechanism as recited in claim 1 wherein said standards-based software calls are C language calls.

4. The calling mechanism as recited in claim 1 wherein said at least one nonstandard call is a C++ language call.

5. The calling mechanism as recited in claim 1 wherein said dynamic linked application objects are of varying cardinality.

6. The calling mechanism as recited in claim 1 wherein said static linked application objects are of varying cardinality.

7. The calling mechanism as recited in claim 1 wherein said call router detects said software call types by detecting an interface pointer structure (IPS) pointer associated with each of said dynamic linked application objects.

8. For use within a computer-based digital control system, a method of allowing both dynamic linked application objects and static linked application objects created with heterogeneous development tool sets to interact with a kernel of said system via calls, comprising the steps of:

providing a dynamic link interface that employs only standards-based software calls to allow said dynamic linked application objects to interact with said kernel via calls;

providing a static link interface that employs at least one non-standard software call to allow said static link application objects to interact with said kernel via calls;

detecting software call types; and routing said software calls to a selected one of said dynamic link interface and said static link interface based on said software call types.

9. The method as recited in claim 8 wherein said standards-based software calls are based on American National Standards Institute (ANSI) standards.

10. The method as recited in claim 8 wherein said standards-based software calls are C language calls.

11. The method as recited in claim 8 wherein said at least one nonstandard call is a C++ language call.

12. The method as recited in claim 8 wherein said dynamic linked application objects are of varying cardinality.

13. The method as recited in claim 8 wherein said static linked application objects are of varying cardinality.

14. The method as recited in claim 8 wherein said step of detecting comprises the step of detecting an interface pointer structure (IPS) pointer associated with each of said dynamic linked application objects.

15. A real time plant control system, comprising:

a plurality of sensors and controllable devices;

a digital process controller, coupled to said plurality of sensors and controllable devices and capable of executing a kernel, dynamic linked application objects and static linked application objects to receive sensed data from said plurality of sensors and provide control data to said plurality of controllable devices; and     a calling mechanism that allows both dynamic linked application objects and static linked application objects created with heterogeneous development tool sets to interact with said kernel via calls, including:

a dynamic link interface that employs only standards-based software calls to allow said dynamic linked application objects to interact with said kernel via calls,         a static link interface that employs at least one non-standard software call to allow said static link application objects to interact with said kernel via calls, and         at least one call router, operative to manage software calls among said kernel, said dynamic link application objects and said static link application objects, that detects software call types and routes said software calls to a selected one of said dynamic link interface and said static link interface based on said software call types.

16. The system as recited in claim 15 wherein said standards-based software calls are based on American National Standards Institute (ANSI) standards.

17. The system as recited in claim 15 wherein said standards-based software calls are C language calls'.

18. The system as recited in claim 15 wherein said at least one nonstandard call is a C++ language call.

19. The system as recited in claim 15 wherein said dynamic linked application objects are of varying cardinality.

20. The system as recited in claim 15 wherein said static linked application objects are of varying cardinality.

21. The system as recited in claim 15 wherein said call router detects said software call types by detecting an interface pointer structure (IPS) pointer associated with each of said dynamic linked application objects.

\* \* \* \* \*

UNITED STATES PATENT AND TRADEMARK OFFICE
CERTIFICATE OF CORRECTION

PATENT NO.   : 6,259,958 B1                                         Page 1 of 1
DATED        : July 10, 2001
INVENTOR(S)  : Jethro F. Steinman; Pekka M. Salpakari; Hannu J. Rahikainen; Matti H. Ollikainen; Alexander V. Chernoguzov; Shashank S. Narayan It is certified that error appears in the above-identified patent and that said Letters Patent is hereby corrected as shown below:

Title page,
Inventor, correct "Hannu J. Rehikainen" to -- Hannu J. Rahikainen --
Inventor, correct "Alexander V. Chernoquzov" to -- Alexander V. Chernoguzov --

Signed and Sealed this

Fifth Day of March, 2002

Attest:

Attesting Officer

JAMES E. ROGAN
*Director of the United States Patent and Trademark Office*